United States Patent
Mori et al.

(10) Patent No.: US 9,200,550 B2
(45) Date of Patent: Dec. 1, 2015

(54) HYDRAULIC EXCAVATOR

(71) Applicant: KOMATSU LTD., Tokyo (JP)

(72) Inventors: Tadashi Mori, Hirakata (JP); Manabu Himoto, Kyotanabe (JP); Osamu Nishimura, Joyo (JP); Kenji Sanada, Hirakata (JP)

(73) Assignee: KOMATSU LTD., Tokyo (JP)

(*) Notice: Subject to any disclaimer, the term of this patent is extended or adjusted under 35 U.S.C. 154(b) by 0 days.

(21) Appl. No.: 14/114,681

(22) PCT Filed: Apr. 4, 2013

(86) PCT No.: PCT/JP2013/060290
§ 371 (c)(1),
(2) Date: Oct. 29, 2013

(87) PCT Pub. No.: WO2014/061295
PCT Pub. Date: Apr. 24, 2014

(65) Prior Publication Data
US 2014/0102085 A1 Apr. 17, 2014

(30) Foreign Application Priority Data

Oct. 16, 2012 (JP) .................. 2012-228792

(51) Int. Cl.
*F01N 3/033* (2006.01)
*B60K 13/04* (2006.01)
(Continued)

(52) U.S. Cl.
CPC ............ *F01N 3/033* (2013.01); *B60K 13/04* (2013.01); *E02F 9/0866* (2013.01); *F01N 3/023* (2013.01);
(Continued)

(58) Field of Classification Search
CPC ............ F01N 13/009; F01N 13/1811; F01N 13/1816; F01N 13/1822; F01N 2340/04; F01N 2470/00
USPC ........................................................... 60/322
See application file for complete search history.

(56) References Cited

U.S. PATENT DOCUMENTS

2010/0000203 A1* 1/2010 Kowada ................ 60/286
2010/0218488 A1 9/2010 Yokota
(Continued)

FOREIGN PATENT DOCUMENTS

JP 2009-103016 A 5/2009
JP 2010-71176 A 4/2010
(Continued)

OTHER PUBLICATIONS

International Search Report for PCT/JP2013/060290, issued on Jun. 11, 2013.

*Primary Examiner* — Kenneth Bomberg
*Assistant Examiner* — Jonathan Matthias
(74) *Attorney, Agent, or Firm* — Global IP Counselors, LLP

(57) ABSTRACT

A hydraulic excavator includes an engine, a rotating frame, a vehicle body frame, a diesel particulate filtering device, a selective catalytic reduction device, and a connecting pipe. The diesel particulate filtering device and the selective catalytic reduction device are supported by a vehicle body frame. At least a portion of the connecting pipe includes an extendable bellows part. The connecting pipe connects the engine and the diesel particulate filtering device. The diesel particulate filtering device is located further away from the engine than the selective catalytic reduction device along a first direction on a horizontal plane. The first tubular body portion of the diesel particulate filtering device and the second tubular body portion of the selective catalytic reduction device are disposed apart from each other with a space therebetween in a plan view.

12 Claims, 9 Drawing Sheets

(51) Int. Cl.
  F01N 3/08    (2006.01)
  F01N 3/24    (2006.01)
  F01N 3/28    (2006.01)
  E02F 9/08    (2006.01)
  F01N 3/20    (2006.01)
  F01N 13/18   (2010.01)
  F01N 3/023   (2006.01)
  F01N 3/035   (2006.01)

(52) U.S. Cl.
  CPC  *F01N 3/035* (2013.01); *F01N 3/08* (2013.01);
       *F01N 3/2066* (2013.01); *F01N 3/24* (2013.01);
       *F01N 3/28* (2013.01); *F01N 3/2882* (2013.01);
       *F01N 13/1816* (2013.01); *F01N 2340/00* (2013.01); *F01N 2340/04* (2013.01); *F01N 2590/08* (2013.01); *F01N 2610/02* (2013.01); *Y02T 10/24* (2013.01)

(56) References Cited

U.S. PATENT DOCUMENTS

2011/0154809 A1   6/2011   Mitsuda et al.
2012/0247861 A1   10/2012  Mizuno et al.

FOREIGN PATENT DOCUMENTS

JP   2012-97413 A     5/2012
WO   2011/152306 A1   12/2011

* cited by examiner

HYDRAULIC EXCAVATOR

CROSS-REFERENCE TO RELATED APPLICATIONS

This application is a U.S. National stage application of International Application No. PCT/JP2013/060290, filed on Apr. 4, 2013. This U.S. National stage application claims priority under 35 U.S.C. §119(a) to Japanese Patent Application No. 2012-228792, filed in Japan on Oct. 16, 2012, the entire contents of which are hereby incorporated herein by reference.

BACKGROUND

1. Field of the Invention

The present invention relates to a hydraulic excavator.

2. Background Information

Hydraulic excavators are equipped with exhaust processing devices. An exhaust processing device for processing exhaust from an engine is connected to the engine through a connection pipe. The exhaust processing device includes a diesel particulate filtering device and a selective catalytic reduction device. The diesel particulate filtering device reduces particulate matter in the exhaust. The selective catalytic reduction device reduces nitrogen oxides (NOx) in the exhaust.

The exhaust processing device is attached to the engine so as to be supported by the engine, and thus a heavy object is arranged on top of the engine. Consequently, the load on a bracket for attaching the exhaust processing device to the engine becomes larger. The weight of the bracket increases when the size of the bracket is increased to strengthen the bracket.

Therefore, the exhaust processing device is preferably attached to a supporting object other than the engine. For example, in Japanese Laid-open Patent 2012-097413, a table is provided with supporting legs on an upper frame. The diesel particulate filtering device and the selective catalytic reduction device are arranged on the upper surface of the table.

SUMMARY

When the exhaust processing device is supported by a supporting object other than the engine as described above, there is a possibility that inaccuracies in the positions of the engine and the exhaust processing device may occur due to the precision of the manufacturing and installation of the supporting object. In this case, the connection between the engine and the exhaust processing device may become difficult.

When the exhaust processing device is supported by a supporting object other than the engine as described above, there is a possibility that the supporting object may deflect due to the weight of the exhaust processing device. As a result, inaccuracies in the positions of the exhaust processing device and the engine may occur and the connection between the engine and the exhaust processing device become difficult.

Furthermore, when the supporting object is arranged on the upper frame as described in Japanese Laid-open Patent 2012-097413, the exhaust processing device is affected by vibration from the upper frame. Conversely, the connecting pipe for connecting the exhaust processing device and the engine is affected by vibrations from the engine. Consequently, a load acts upon the connection pipe due to the difference in the vibrations of the engine and the supporting object.

An object of the present invention is to provide a hydraulic excavator that can resolve difficulties when connecting the engine and the exhaust processing device and that can reduce a load on the connecting pipe due to vibration.

A hydraulic excavator according to a first aspect of the present invention comprises a rotating frame, a vehicle body frame, a diesel particulate filtering device, a selective catalytic reduction device, and a connecting pipe. The rotating frame supports an engine. The vehicle body frame is provided in a standing manner on the rotating frame. The vehicle body frame includes a plurality of column members. The diesel particulate filtering device is supported by the vehicle body frame and includes a first tubular body portion. The diesel particulate filtering device processes exhaust from the engine. The selective catalytic reduction device is supported by the vehicle body frame and includes a second tubular body portion. The selective catalytic reduction device processes exhaust from the engine. The connecting pipe includes a bellows part that is extendable in at least a portion thereof. The connecting pipe connects the engine and the diesel particulate filtering device. The diesel particulate filtering device is located further away from the engine than the selective catalytic reduction device in a first direction on a horizontal plane. The first tubular body portion of the diesel particulate filtering device and the second tubular body portion of the selective catalytic reduction device are disposed apart from each other with a space therebetween in a plan view.

The hydraulic excavator according to a second aspect of the present invention is related to the hydraulic excavator of the first aspect, wherein, the engine, the selective catalytic reduction device, and the diesel particulate filtering device are arranged in a row in the first direction in the order of the engine, the selective catalytic reduction device, and the diesel particulate filtering device in a plan view.

The hydraulic excavator according to a third aspect of the present invention is related to the hydraulic excavator of the first and second aspects, wherein the first direction is the vehicle width direction.

The hydraulic excavator according to a fourth aspect of the present invention is related to the hydraulic excavator of the first and second aspects, wherein the diesel particulate filtering device and the selective catalytic reduction device are arranged in a row in a state in which the respective longitudinal directions are orthogonal to the first direction. The length of the bellows part is greater than the dimension of the diesel particulate filtering device in the first direction or greater than the dimension of the selective catalytic reduction device in the first direction.

The hydraulic excavator according to a fifth aspect of the present invention is related to the hydraulic excavator of the third aspect, wherein the second tubular body portion has a cylindrical shape. The length of the bellows part is greater than the diameter of the second tubular body portion.

The hydraulic excavator according to a sixth aspect of the present invention is related to the hydraulic excavator of the third aspect, wherein the first tubular body portion has a cylindrical shape. The length of the bellows part is greater than the diameter of the first tubular body portion.

The hydraulic excavator according to a seventh aspect of the present invention is related to the hydraulic excavator of the first and second aspects, wherein the diesel particulate filtering device and the selective catalytic reduction device are arranged in a row in a state in which the respective longitudinal directions are orthogonal to the first direction. The length of the connecting pipe in the first direction is greater than the distance between the center of the diesel particulate filtering device in the first direction and the center of the selective catalytic reduction device in the first direction.

The hydraulic excavator according to an eighth aspect of the present invention is related to the hydraulic excavator of the first aspect, and further includes a second connecting pipe. The second connecting pipe connects the diesel particulate filtering device and the selective catalytic reduction device. Exhaust from the diesel particulate filtering device is supplied to the selective catalytic reduction device through the second connecting pipe.

The hydraulic excavator according to a ninth aspect of the present invention is related to the hydraulic excavator of the first aspect, wherein, a connecting portion of the diesel particulate filtering device is located directly below the diesel particulate filtering device.

The hydraulic excavator according to a tenth aspect of the present invention is related to the hydraulic excavator of the first aspect, and further includes an exterior cover attached to the vehicle body frame.

The hydraulic excavator according to a eleventh aspect of the present invention is related to the hydraulic excavator of the first aspect, wherein, the connecting pipe passes below the selective catalytic reduction device and is connected to the diesel particulate filtering device.

The hydraulic excavator according to the first aspect of the present invention is able to absorb differences in vibration between the engine and the vehicle body frame due to the bellows part of the connecting pipe. Consequently, a load on the connecting pipe is reduced. If inaccuracies between the locations of the engine and the diesel particulate filtering device are generated, the inaccuracies can be absorbed by the bellows part. Consequently, the engine and the diesel particulate filtering device can be connected easily.

The diesel particulate filtering device is located further away from the engine than the selective catalytic reduction device in a first direction on a horizontal plane. Therefore, the lengths of the connecting pipe and the bellows part can be made greater in a reliable manner. The first tubular body portion of the diesel particulate filtering device and the second tubular body portion of the selective catalytic reduction device are disposed apart from each other in a plan view. Therefore, in comparison with a case that the first tubular body portion and the second tubular body portion are overlapped with each other, the lengths of the connecting pipe and the bellows part can be made greater in a reliable manner. Consequently, the engine and the diesel particulate filtering device can be connected easily and the load on the connecting pipe due to vibration can be reduced.

In the hydraulic excavator according to the second aspect of the present invention, the engine, the selective catalytic reduction device, and the diesel particulate filtering device are arranged in order in a row in the first direction when seen in a plan view. Consequently, the lengths of the connecting pipe and the bellows part can be made greater in a reliable manner.

In the hydraulic excavator according to the third aspect of the present invention, the lengths of the connecting pipe and the bellows part can be made greater in a reliable manner in the vehicle width direction.

In the hydraulic excavator according to the fourth aspect of the present invention, the length of the bellows part can be made greater in a reliable manner. Consequently, the load on the connecting pipe due to vibration can be further reduced. Inaccuracies between the locations of the engine and the diesel particulate filtering device can be absorbed in a wider range by the bellows part.

In the hydraulic excavator according to the fifth aspect of the present invention, the length of the bellows part can be made greater in a reliable manner. Consequently, the load on the connecting pipe due to vibration can be further reduced. Inaccuracies between the locations of the engine and the diesel particulate filtering device can be absorbed in a wider range by the bellows part.

In the hydraulic excavator according to the sixth aspect of the present invention, the length of the bellows part can be made greater in a reliable manner. Consequently, the load on the connecting pipe due to vibration can be further reduced. Inaccuracies between the locations of the engine and the diesel particulate filtering device can be absorbed in a wider range by the bellows part.

In the hydraulic excavator according to the seventh aspect of the present invention, the length of the bellows part can be made greater in a reliable manner. Consequently, the load on the connecting pipe due to vibration can be further reduced. Inaccuracies between the locations of the engine and the diesel particulate filtering device can be absorbed in a wider range by the bellows part.

In the hydraulic excavator according to the eighth aspect of the present invention, exhaust processed by the diesel particulate filtering device is supplied to the selective catalytic reduction device through the second connecting pipe.

In the hydraulic excavator according to a ninth aspect of the present invention, the connecting portion for the diesel particulate filtering device and the connecting pipe is located directly below the diesel particulate filtering device. Therefore, the connecting pipe is less likely to cause interference with the diesel particulate filtering device when lifting upward and removing the diesel particulate filtering device from the vehicle. As a result, the diesel particulate filtering device can be removed from the vehicle easily even if the connecting pipe is long. Consequently, maintenance of the diesel particulate filtering device can be improved.

In the hydraulic excavator according to the tenth aspect of the present invention, an exterior cover is attached to the vehicle body frame. Specifically, the vehicle body frame includes the functions of supporting the exterior cover and supporting the diesel particulate filtering device and the selective catalytic reduction device.

In the hydraulic excavator according to the eleventh aspect of the present invention, the connecting pipe is less likely to cause interference with the diesel particulate filtering device when lifting upward and removing the diesel particulate filtering device from the vehicle. As a result, the diesel particulate filtering device can be removed from the vehicle easily even if the connecting pipe is long. Consequently, maintenance of the diesel particulate filtering device can be improved.

DETAILED DESCRIPTION OF EMBODIMENTS

Figure 1:
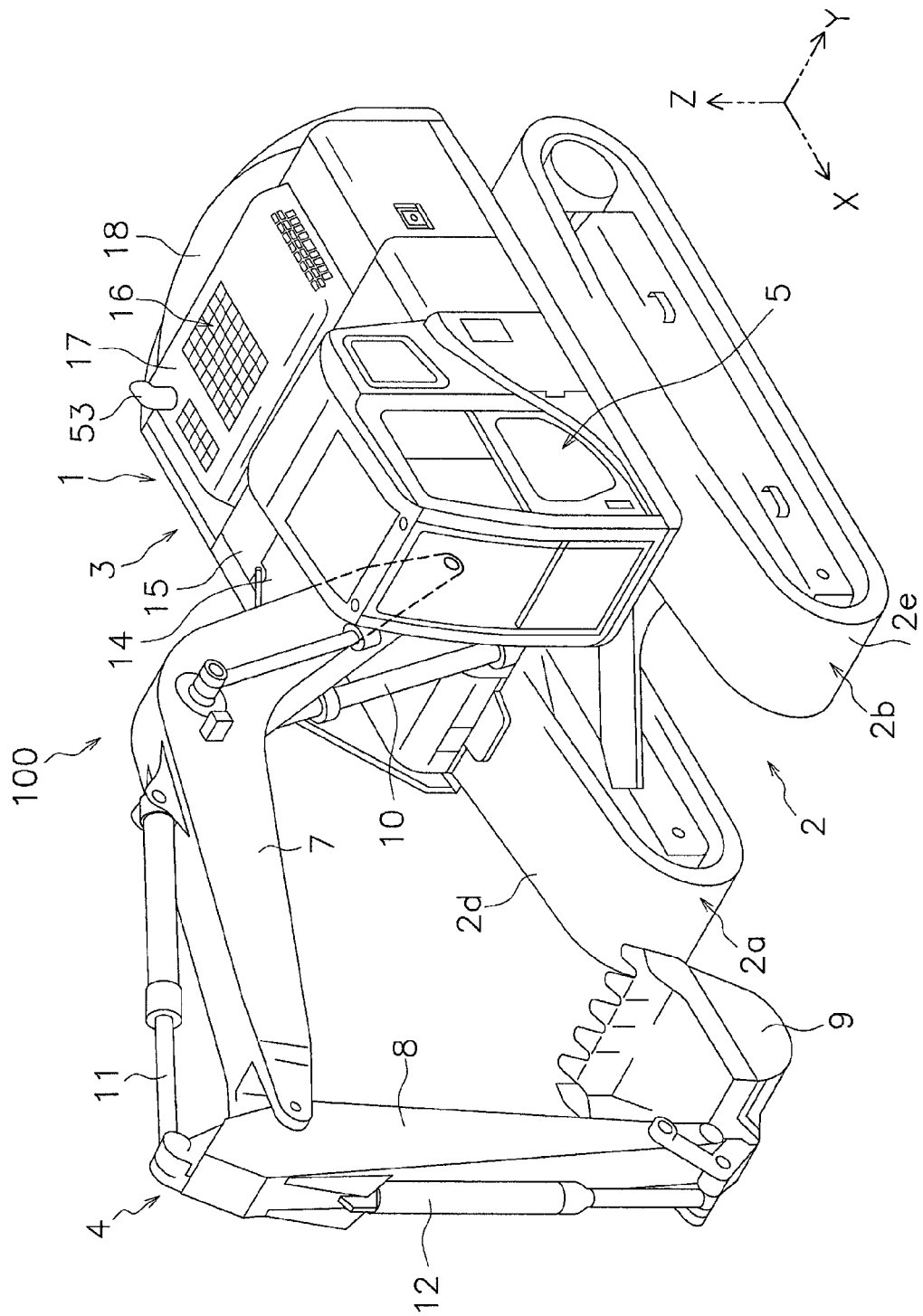
FIG. 1 is a perspective view of a hydraulic excavator according to a first embodiment of the present invention.

FIG. 1 illustrates a hydraulic excavator 100 according to a first embodiment of the present invention. The hydraulic excavator 100 is equipped with a vehicle body 1 and work implement 4.

The vehicle body 1 includes a travel unit 2 and a revolving unit 3. The travel unit 2 includes a pair of travel devices 2a, 2b. The travel devices 2a, 2b respectively include crawlers 2d, 2e. The travel devices 2a, 2b allow the hydraulic excavator 100 to travel due to the crawlers 2d, 2e being driven by driving power from a belowmentioned engine 21 (see FIG. 2).

A front-back direction in the following explanation signifies the front-back direction of the vehicle body 1. In other words, the front-back direction is the direction of the front and back as seen by an operator sitting in an operating cabin 5. The left and right direction or the lateral direction signifies the vehicle width direction of the vehicle body 1. In other words, the left and right direction, the vehicle width direction, or the lateral direction signifies the direction to the left and right seen from the above operator. In the drawings, the front-back direction is depicted as the X axis, the left and right direction is depicted as the Y axis, and the vertical direction is depicted as the Z axis.

The revolving unit 3 is mounted on the travel unit 2. The revolving unit 3 is provided in a rotatable manner with respect to the travel unit 2. The operating cabin 5 is provided in the revolving unit 3. The revolving unit 3 includes a fuel tank 14, an hydraulic fluid tank 15, an engine room 16, and a counterweight 18. The fuel tank 14 accommodates fuel for driving the belowmentioned engine 21. The fuel tank 14 is arranged in front of the hydraulic fluid tank 15. The hydraulic fluid tank 15 accommodates hydraulic fluid discharged from a belowmentioned hydraulic pump 23 (see FIG. 2). The hydraulic fluid tank 15 is arranged in line in the front-back direction with the fuel tank 14.

The engine room 16 houses equipment such as the engine 21 and the hydraulic pump 23 as described below. The engine room 16 is arranged to the rear of the operating cabin 5, the fuel tank 14, and the hydraulic fluid tank 15. The top of the engine room 16 is covered by an engine hood 17. The counterweight 18 is arranged to the rear of the engine room 16.

The work implement 4 is attached in a front center location of the revolving unit 3. The work implement 4 includes a boom 7, an arm 8, a bucket 9, a boom cylinder 10, an arm cylinder 11, and a bucket cylinder 12. The base end of the boom 7 is coupled to the revolving unit 3 in a rotatable manner. The front end of the boom 7 is coupled in a rotatable manner to the base end of the arm 8. The front end of the arm 8 is coupled in a rotatable manner to the bucket 9. The boom cylinder 10, the arm cylinder 11, and the bucket cylinder 12 are hydraulic cylinders and are driven by hydraulic fluid discharged from the belowmentioned hydraulic pump 23. The boom cylinder 10 actuates the boom 7. The arm cylinder 11 actuates the arm 8. The bucket cylinder 12 actuates the bucket 9. The work implement 4 is driven by driving the cylinders 10, 11, 12.

Figure 2:
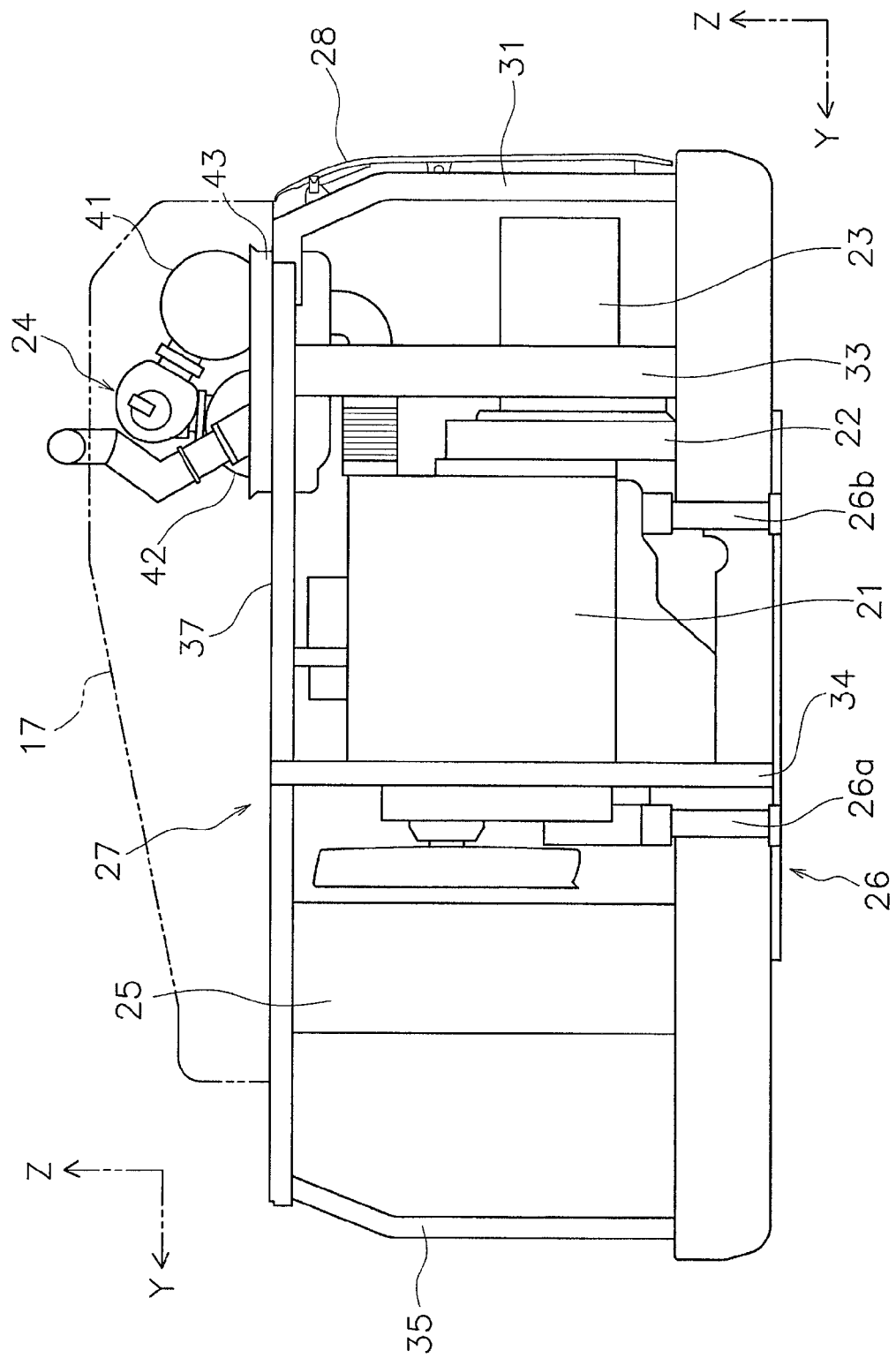
FIG. 2 illustrates an internal structure of an engine room of the hydraulic excavator as seen from the rear.
Figure 3:
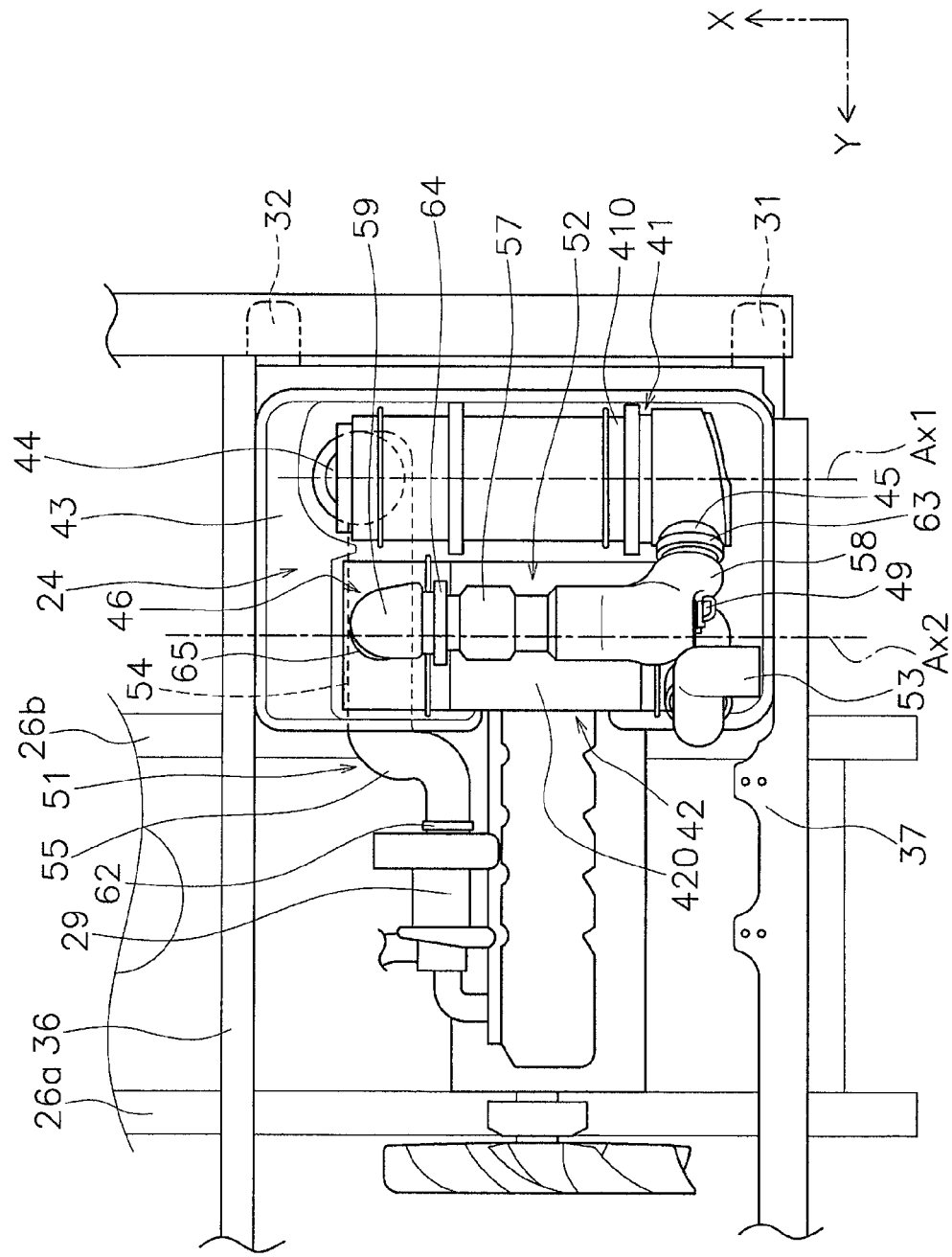
FIG. 3 is a top view illustrating the internal structure of the engine room.

FIG. 2 illustrates the internal structure of the engine room 16 as seen from the rear. FIG. 3 is a top view illustrating the internal structure of the engine room 16. As illustrated in FIG. 2, the engine 21, a flywheel housing 22, the hydraulic pump 23, and an exhaust processing unit 24 are arranged in the engine room 16. A cooling device 25 including a radiator and an oil cooler is arranged in the engine room 16. The cooling device 25, the engine 21, the flywheel housing 22, and the hydraulic pump 23 are arranged in a row in the vehicle width direction.

As illustrated in FIG. 2, the hydraulic excavator 100 includes a rotating frame 26 and a vehicle body frame 27. The rotating frame 26 includes a pair of center frames 26a, 26b that extend along the front-back direction. The rotating frame 26 supports the engine 21 via a rubber damper.

The vehicle body frame 27 is provided on the rotating frame 26 in a standing manner. The vehicle body frame 27 is arranged around equipment such as the engine 21 and the hydraulic pump 23 and the like. An exterior cover 28 is attached to the vehicle body frame 27. Only a portion of the exterior cover 28 is shown in FIG. 2. The engine hood 17 illustrated in FIG. 1 is also attached to the vehicle body frame 27.

As illustrated in FIGS. 2 and 3, the vehicle body frame 27 includes a plurality of column members 31 to 35 and a plurality of beam members 36, 37. The column members 31 to 35 are arranged to extend upwards from the rotating frame 26. The beam members 36, 37 are supported by the column members 31 to 35. Specifically, as illustrated in FIG. 3, the plurality of beam members 36, 37 include a first beam member 36 and a second beam member 37. The first beam member 36 and the second beam member 37 are arranged away from each other in the front-back direction. The first beam member 36 is arranged in front of the engine 21. The second beam member 36 is arranged behind the engine 21.

The hydraulic pump 23 is driven by the engine 21. As illustrated in FIG. 2, the hydraulic pump 23 is arranged beside the engine 21. Specifically, the hydraulic pump 23 is arranged in a row with the engine 21 in the vehicle width direction. The hydraulic pump 23 is arranged in a location below an upper surface of the engine 21.

The flywheel housing 22 is arranged between the engine 21 and the hydraulic pump 23. The flywheel housing 22 is attached to a side surface the engine 21. The hydraulic pump 23 is attached to a side surface the flywheel housing 22.

The exhaust processing unit 24 includes a diesel particulate filtering device 41, a selective catalytic reduction device 42, and a bracket 43. The exhaust processing unit 24 is arranged above the hydraulic pump 23. The exhaust processing unit 24 is arranged so as to cross between the first beam member 36 and the second beam member 37. The exhaust processing unit 24 is supported by the beam members 36, 37. Specifically, the diesel particulate filtering device 41 and the selective catalytic reduction device 42 are supported by the vehicle body frame 27.

The diesel particulate filtering device 41 is a device for processing exhaust from the engine 21. The diesel particulate filtering device 41 collects particulate matter included in the exhaust with a filter. The diesel particulate filtering device 41 burns the collected particulate matter with a heater provided with the filter.

The diesel particulate filtering device 41 includes a first tubular body portion 410. The outer shape of the first tubular body portion 410 is a generally cylindrical shape. As illustrated in FIG. 3, a central axis Ax1 of the diesel particulate filtering device 41 is arranged along the front-back direction. Therefore, the central axis Ax1 of the diesel particulate filtering device 41 is arranged to be orthogonal to the direction in which the engine 21 and the hydraulic pump 23 are arranged (referred to as "first direction" below). In other words, the longitudinal direction of the diesel particulate filtering device 41 is arranged in a state of being orthogonal to the first direction. The central axis Ax1 of the diesel particulate filtering device 41 is arranged to be parallel to a central axis Ax2 of the selective catalytic reduction device 42.

The diesel particulate filtering device 41 is located further away from the engine than the selective catalytic reduction device 42 in a first direction on a horizontal plane. Specifically, projections of each of the engine 21, the selective catalytic reduction device 42, and the diesel particulate filtering device 41 in the horizontal plane are arranged to form a row in the first direction in the order of the engine 21, the selective catalytic reduction device 42, and the diesel particulate filtering device 41. The first direction is the vehicle width direction in the present embodiment. Specifically, as illustrated in FIG. 3, the engine 21, the selective catalytic reduction device 42 and the diesel particulate filtering device 41 are arranged in a row in this order along the first direction which is the vehicle width direction. Therefore, the diesel particulate filtering device 41 is located further away from the engine 21 than the selective catalytic reduction device 42.

Figure 4:
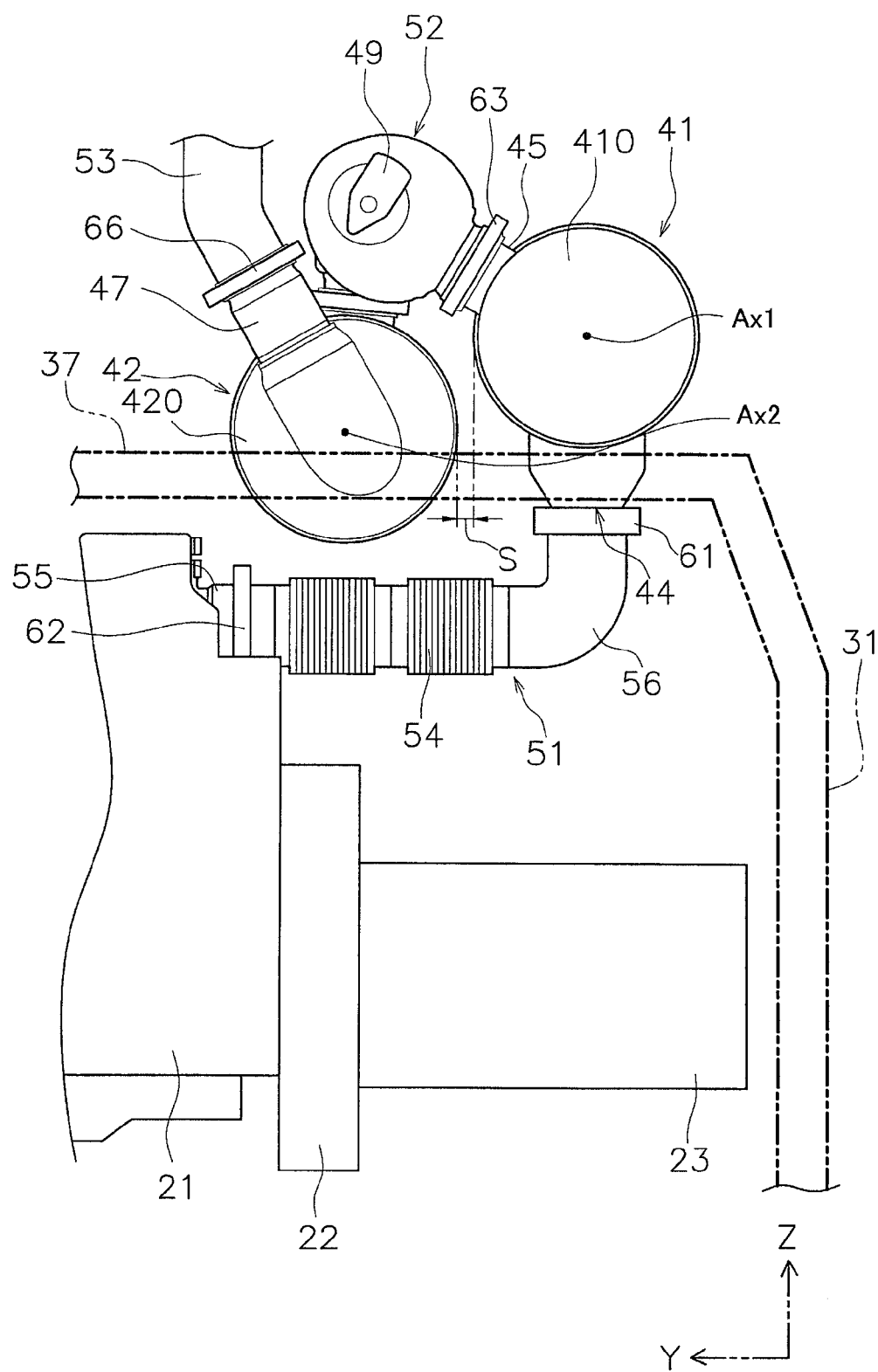
FIG. 4 illustrates a diesel particulate filtering device and a selective catalytic reduction device as seen from the rear.

FIG. 4 illustrates the diesel particulate filtering device 41 and the selective catalytic reduction device 42 as seen from the rear. Portions of the structure such as the bracket 43 are omitted in FIG. 4 to facilitate understanding. As illustrated in FIG. 4, the diesel particulate filtering device 41 and the selective catalytic reduction device 42 are arranged near each other and the longitudinal directions thereof are arranged in a row to be orthogonal to the vehicle width direction.

The top portion of the diesel particulate filtering device 41 is located above the top portion of the selective catalytic reduction device 42. The bottom portion of the diesel particulate filtering device 41 is located above the bottom portion of the selective catalytic reduction device 42. The bottom portion of the diesel particulate filtering device 41 is located below the top portion of the selective catalytic reduction device 42. The diesel particulate filtering device 41 is arranged above the hydraulic pump 23. The diesel particulate filtering device 41 is above the beam members 36, 37.

The selective catalytic reduction device 42 is a device for processing exhaust from the engine 21. The selective catalytic reduction device 42 conducts hydrolysis of urea and selectively reduces nitrogen oxides NOx. The selective catalytic reduction device 42 includes a second tubular body portion 420. The outer shape of the second tubular body portion 420 is a generally cylindrical shape. The central axis Ax2 of the selective catalytic reduction device 42 is arranged along the front-back direction. Therefore, the central axis Ax1 of the diesel particulate filtering device 41 is arranged to be orthogonal to the first direction. In other words, the longitudinal direction of the diesel particulate filtering device 41 is arranged in a state of being orthogonal to the first direction.

The selective catalytic reduction device 42 is arranged above the hydraulic pump 23. The bottom of the selective catalytic reduction device 42 is located below the upper surface of the engine 21. The bottom of the selective catalytic reduction device 42 is located below the beam members 36, 37. The top portion of the selective catalytic reduction device 42 is located above the beam members 36, 37.

The first tubular body portion 410 of the diesel particulate filtering device 41 and the second tubular body portion 420 of the selective catalytic reduction device 42 are disposed apart from each other in the first direction with a space S therebetween in a plan view. Specifically the first tubular body portion 410 and the second tubular body portion 420 are not overlapped with each other in a plan view.

The diesel particulate filtering device 41 includes a first connection port 44. As illustrated in FIG. 4, the hydraulic excavator 100 includes a first connecting pipe 51. As illustrated in FIG. 3, one end of the first connecting pipe 51 is connected to an exhaust port of the engine 21 through a supercharger 29. As illustrated in FIG. 4, the other end of the first connecting pipe 51 is connected to the first connection port 44 of the diesel particulate filtering device 41. Specifically, the first connecting pipe 51 couples the engine 21 and the diesel particulate filtering device 41.

The first connection port 44 is located in the bottom portion of the diesel particulate filtering device 41. The first connection port 44 projects downward from the first tubular body portion 410. Therefore, the connecting portion for the diesel particulate filtering device 41 and the first connecting pipe 51 is located directly below the diesel particulate filtering device 41. Specifically, the first connecting pipe 51 is connected to the diesel particulate filtering device 41 through a spherical joint 61. A known technique disclosed in, for example, US 2011/0074150A1 may be used as the spherical joint 61.

As illustrated in FIG. 4, the first connecting pipe 51 includes an extendable bellows part 54. For example, the bellows part 54 is formed by coupling a plurality of bellow-shaped extendable joints. The bellows part 54 is arranged horizontally. Specifically, the bellows part 54 extends in the vehicle width direction. The bellows part 54 is arranged above the hydraulic pump 23. The bellows part 54 is located below the beam members 36, 37. A portion of the bellows part 54 is located below the selective catalytic reduction device 42. Specifically, the first connecting pipe 51 passes below the selective catalytic reduction device 42 to be connected to the diesel particulate filtering device 41. When the bellows part 54 is configured with the plurality of bellow-shaped extendable joints, the length of the bellows part 54 is the accumulative length of the bellow-shaped extendable joints.

The length of the first connecting pipe 51 in the vehicle width direction is greater than the distance between the center of the diesel particulate collection in the vehicle width direction and filtering device 41 and the center of the selective catalytic reduction device 42 in the vehicle width direction. In other words, the length of the first connecting pipe 51 in the vehicle width direction is greater than the distance in the vehicle width direction between the central axis Ax1 of the diesel particulate filtering device 41 and the central axis Ax2 of the selective catalytic reduction device 42.

The length (path length) of the bellows part 54 is greater than the dimension of the diesel particulate filtering device 41 in the vehicle width direction. Specifically, the length of the bellows part 54 is greater than the diameter of the diesel particulate filtering device 41. The length of the bellows part 54 is greater than the dimension of the selective catalytic reduction device 42 in the vehicle width direction. Specifically, the length of the bellows part 54 is greater than the diameter of the selective catalytic reduction device 42.

The first connecting pipe 51 includes a first bend section 55 and a second bend section 56. As illustrated in FIG. 3, the first bend section 55 couples the bellows part 54 and the engine 21. As illustrated in FIG. 4, the first bend section 55 is connected to the bellows part 54 through a spherical joint 62. The second bend section 56 couples the bellows part 54 and the first connection port 44. The second bend section 56 is connected to the first connection port 44 through the spherical joint 61.

As illustrated in FIGS. 3 and 4, the diesel particulate filtering device 41 includes a second connection port 45. The second connection port 45 is located further toward the selective catalytic reduction device 42 than the central axis Ax1 of the diesel particulate filtering device 41. The second connection port 45 is located above the central axis Ax1 of the diesel particulate filtering device 41. The second connection port 45 projects obliquely upward in the vehicle width direction from the first tubular body portion 410. The selective catalytic reduction device 42 includes a third connection port 46. As illustrated in FIG. 3, third connection port 46 is located at the top portion of the selective catalytic reduction device 42.

As illustrated in FIGS. 3 and 4, the exhaust processing unit 24 includes a second connecting pipe 52. One end of the second connecting pipe 52 is connected to the second connection port 45 of the diesel particulate filtering device 41. The other end of the second connecting pipe 52 is connected to the third connection port 46 of the selective catalytic reduction device 42. Specifically, the second connecting pipe 52 connects the diesel particulate filtering device 41 and the selective catalytic reduction device 42. The second connecting pipe 52 is located above the selective catalytic reduction device 42.

As illustrated in FIG. 3, the second connecting pipe 52 includes a linear section 57. The linear section 57 is located above the selective catalytic reduction device 42. The linear section 57 extends in a direction parallel to the central axis Ax2 of the selective catalytic reduction device 42. The second connecting pipe 52 includes a third bend section 58 and a fourth bend section 59. The third bend section 58 couples the linear section 57 and the second connection port 45. The third bend section 58 is connected to the second connection port 45 through a spherical joint 63. A urea water injection device 49 is attached to the third bend section 58. The urea water injection device 49 injects urea into the second connecting pipe 52.

The fourth bend section 59 couples the linear section 57 and the third connection port 46. The fourth bend section 59 is connected to the linear section 57 through a spherical joint 64. The fourth bend section 59 is connected to the third connection port 46 through a spherical joint 65.

As illustrated in FIG. 4, the selective catalytic reduction device 42 includes a fourth connection port 47. The fourth connection port 47 projects obliquely upward. Specifically, the fourth connection port 47 projects obliquely upward toward the engine 21. The abovementioned urea water injection device 49 is located above the fourth connection port 47 and the fourth connection port 47 is arranged obliquely to avoid interfering with the urea water injection device 49. The hydraulic excavator 100 includes a third connecting pipe 53. The third connecting pipe 53 is connected to the fourth connection port 47. Specifically, the third connecting pipe 53 is connected to the fourth connection port 47 through a spherical joint 66. A top portion of the third connecting pipe 53 projects upward from the engine hood 17.

The engine 21, the first connecting pipe 51, the diesel particulate filtering device 41, the second connecting pipe 52, the selective catalytic reduction device 42, and the third connecting pipe 53 are connected serially in order. Therefore, the exhaust from the engine 21 passes through the first connecting pipe 51 and is fed to the diesel particulate filtering device 41. The diesel particulate filtering device 41 mainly reduces particulate matter in the exhaust. Next, the exhaust passes through the second connecting pipe 52 and is fed to the selective catalytic reduction device 42. NOx is mainly reduced in the selective catalytic reduction device 42. Next, the purified exhaust passes through the third connecting pipe 53 and is exhausted externally.

The bracket 43 couples the diesel particulate filtering device 41 and the selective catalytic reduction device 42. As a result, the diesel particulate filtering device 41, the selective catalytic reduction device 42, and the bracket 43 are formed in an integrated manner. The bracket 43 is fixed to the vehicle body frame 27. Consequently, the exhaust processing unit 24 is fixed to the vehicle body frame 27. The bracket 43 is attached to the vehicle body frame 27 in a detachable manner by fixing means such as bolts. Therefore, the exhaust processing unit 24 can be removed from the vehicle by removing the bracket 43 from the vehicle body frame 27.

The diesel particulate filtering device 41 can be removed from the vehicle by removing the diesel particulate filtering device 41 from the bracket 43. In this case, the first connecting pipe 51 is removed from the first connection port 44. The second connecting pipe 52 is removed from the second connection port 45. The diesel particulate filtering device 41 then is removed from the bracket 43. The diesel particulate filtering device 41 is lifted upward by hoisting with a crane and the like. As a result, the diesel particulate filtering device 41 can be removed from the vehicle.

The hydraulic excavator 100 according to the present embodiment has the following features.

Differences in vibration between the engine 21 and the vehicle body frame 27 can be absorbed by the bellows part 54 of the first connecting pipe 51. Consequently, a load on the first connecting pipe 51 is reduced. If an inaccuracy between the locations of the engine 21 and the diesel particulate filtering device 41 is generated due to deflection of the vehicle body frame 27 or due to dimensional inaccuracies of the vehicle body frame 27, the inaccuracy can be absorbed by the bellows part 54. As a result, work to couple the engine 21 and the diesel particulate filtering device 41 with the first connecting pipe 51 is made easier.

Further, the diesel particulate filtering device 41 is located further away from the engine 21 than the selective catalytic reduction device 42. As a result, the length of the first connecting pipe 51 can be reliably increased. Therefore, the length of the bellows part 54 can be made greater as described above. Further, the first tubular body portion 410 of the diesel particulate filtering device 41 and the second tubular body portion 420 of the selective catalytic reduction device 42 are disposed apart from each other with a space S therebetween in a plan view. Therefore, in comparison with a case that the first tubular body portion 410 and the second tubular body portion 420 are overlapped with each other, the lengths of the first connecting pipe 51 and the bellows part 54 can be made greater in a reliable manner. Consequently, the load on the first connecting pipe 51 due to vibration can be further reduced.

The diesel particulate filtering device 41 and the selective catalytic reduction device 42 can be supported by using the previously provided vehicle body frame 27. Thus, the diesel particulate filtering device 41 and the selective catalytic reduction device 42 can be supported without using a new member. Consequently, material costs can be reduced.

The connecting portion for the diesel particulate filtering device 41 and the first connecting pipe 51 is located directly below the diesel particulate filtering device 41. As a result, the diesel particulate filtering device 41 can be lifted upward to be easily removed from the vehicle without interference from the first connecting pipe 51.

The exterior cover 28 is attached to the vehicle body frame 27. Specifically, the vehicle body frame 27 includes the functions of supporting the exterior cover 28 and supporting the diesel particulate filtering device 41 and the selective catalytic reduction device 42.

Figure 5:
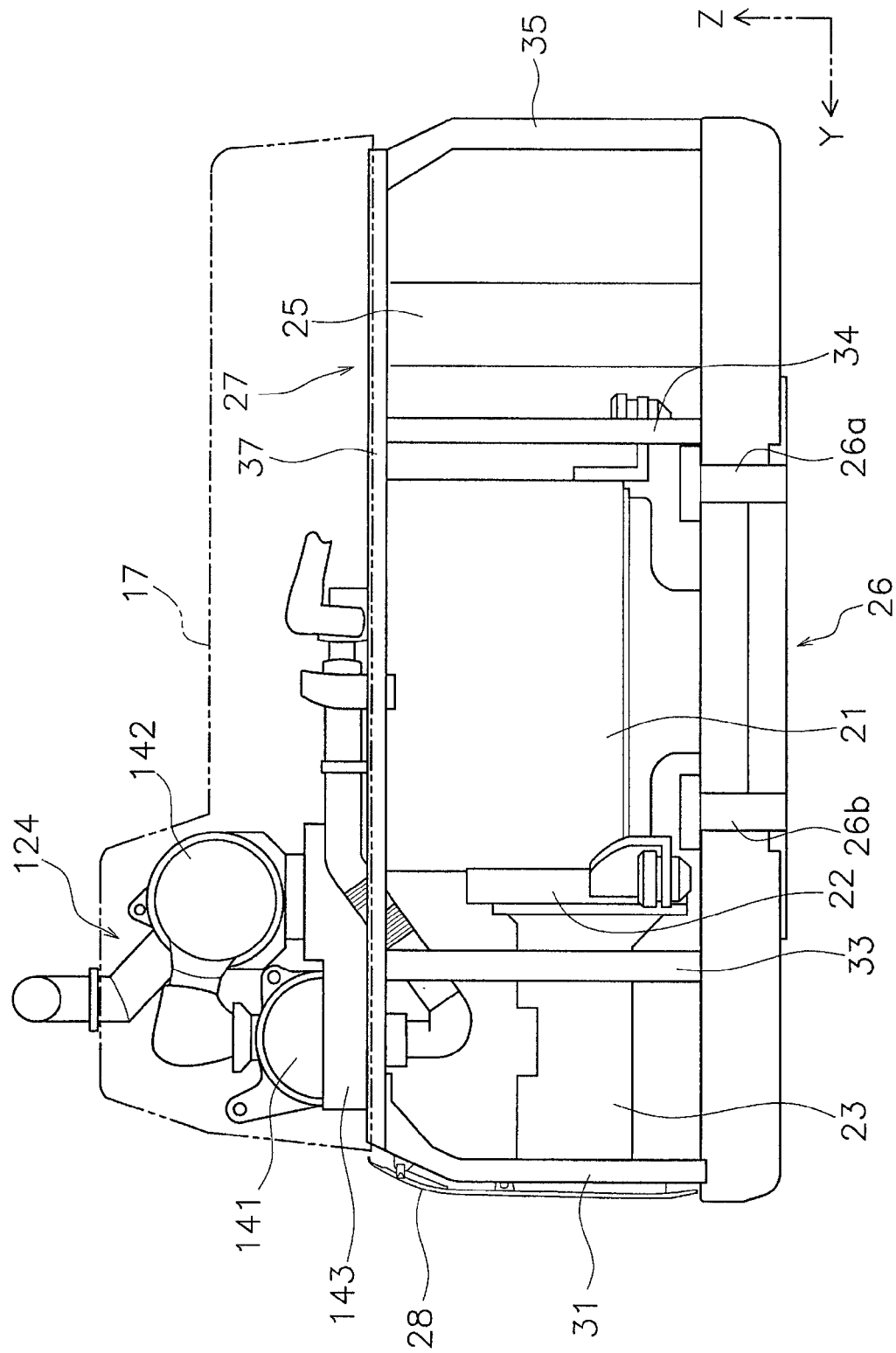
FIG. 5 illustrates the internal structure of the engine room of the hydraulic excavator according to a second embodiment as seen from the rear.
Figure 6:
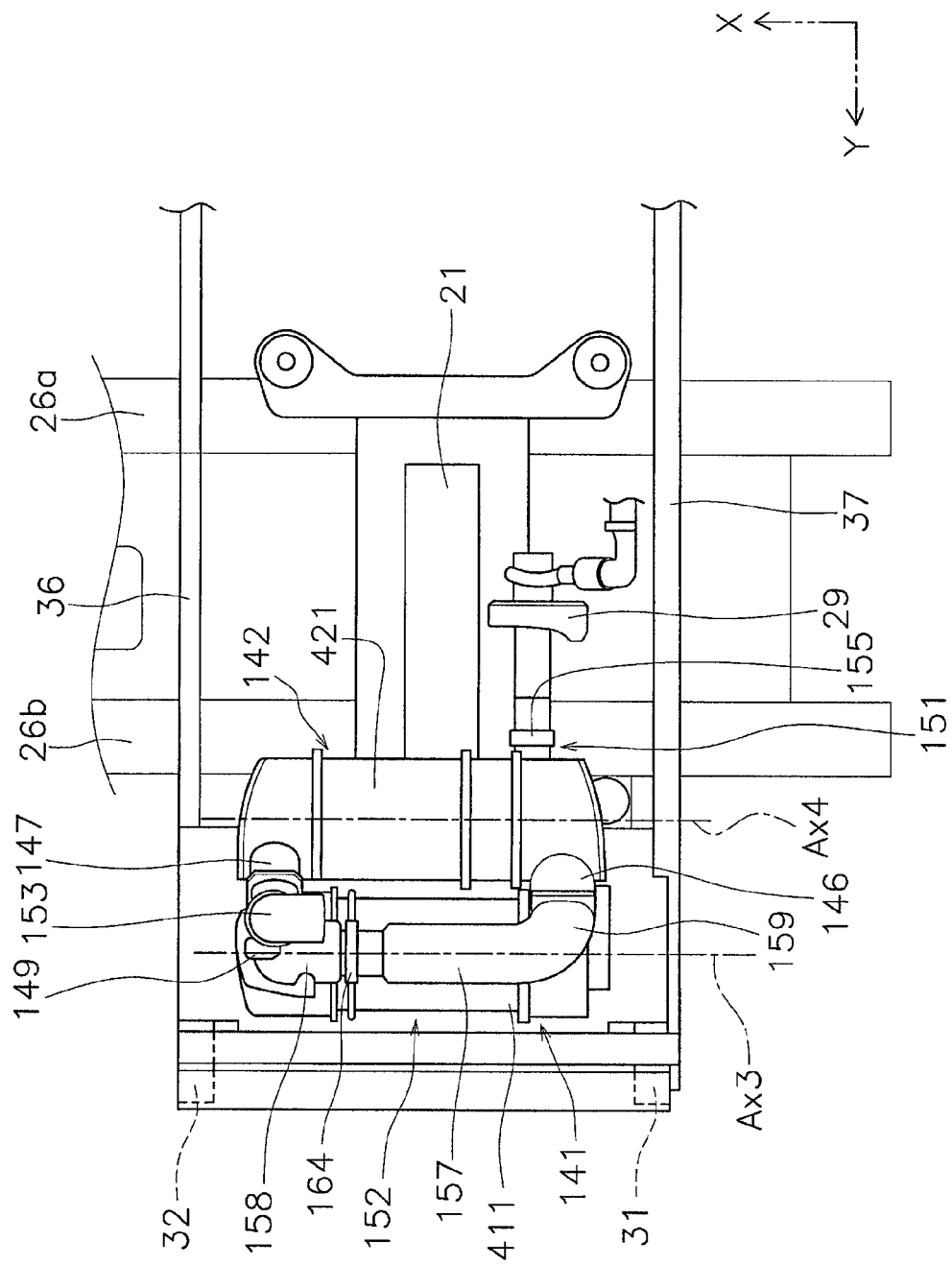
FIG. 6 is a top view illustrating the internal structure of the engine room according to the second embodiment.

Next, a hydraulic excavator according to the second embodiment of the present invention will be described. FIG. 5 illustrates the internal structure of the engine room 16 of the hydraulic excavator according to the second embodiment as seen from the rear. FIG. 6 is a top view of the internal structure of the engine room 16 of the hydraulic excavator according to the second embodiment.

Configurations corresponding to the hydraulic excavator 100 of the first embodiment are provided with the same reference numerals for the hydraulic excavator according to the second embodiment, and explanations thereof will be omitted. As illustrated in FIG. 5, the engine 21, the flywheel housing 22, the hydraulic pump 23, the exhaust processing unit 124, and the cooling device 25 are arranged along the vehicle width direction in the engine room 16.

The cooling device 25, the engine 21, the flywheel housing 22, and the hydraulic pump 23 are arranged in order from the left to the right of the vehicle in the hydraulic excavator 100 according to the above first embodiment. Conversely, the cooling device 25, the engine 21, the flywheel housing 22, and the hydraulic pump 23 are arranged in the opposite order from the right to the left of the vehicle in the hydraulic excavator 100 according to the second embodiment. However, the cooling device 25, the engine 21, the flywheel housing 22, and the hydraulic pump 23 may be arranged in the same order as the hydraulic excavator 100 of the first embodiment from the left to the right of the vehicle in the hydraulic excavator according to the second embodiment. Alternatively, the cooling device 25, the engine 21, the flywheel housing 22, and the hydraulic pump 23 of the hydraulic excavator 100 of the first embodiment may be arranged in the same order as the hydraulic excavator according to the second embodiment from the right to the left of the vehicle.

As illustrated in FIG. 5, the hydraulic excavator according to the second embodiment includes an exhaust processing unit 124. The exhaust processing unit 124 includes a diesel particulate filtering device 141, a selective catalytic reduction device 142, and a bracket 143. The exhaust processing unit 124 is arranged above the hydraulic pump 23. The exhaust processing unit 124 is arranged so as to cross between the first beam member 36 and the second beam member 37. The exhaust processing unit 124 is supported by the beam members 36, 37. Specifically, the diesel particulate filtering device 141 and the selective catalytic reduction device 142 are supported by the vehicle body frame 27.

The diesel particulate filtering device 141 is a device for processing exhaust from the engine 21. The diesel particulate filtering device 141 collects particulate matter included in the exhaust with a filter. The diesel particulate filtering device 141 burns the collected particulate matter with a heater provided with the filter.

The diesel particulate filtering device 141 includes a first tubular body portion 411. The outer shape of the first tubular body portion 411 is a generally cylindrical shape. As illustrated in FIG. 6, a central axis Ax3 of the diesel particulate filtering device 141 is arranged along the front-back direction. Therefore, the central axis Ax3 of the diesel particulate filtering device 141 is arranged to be orthogonal to the first direction that is the vehicle width direction. The central axis Ax3 of the diesel particulate filtering device 141 is arranged to be parallel to a central axis Ax4 of the selective catalytic reduction device 142.

The diesel particulate filtering device 141 is located further away from the engine 21 than the selective catalytic reduction device 142 in the first direction on a horizontal plane. Specifically, projections of each of the engine 21, the selective catalytic reduction device 142, and the diesel particulate filtering device 141 in the horizontal plane are arranged to form a row in the first direction that is the vehicle width direction in the order of the engine 21, the selective catalytic reduction device 142, and the diesel particulate filtering device 141. Specifically, as illustrated in FIG. 6, the engine 21, the selective catalytic reduction device 142, and the diesel particulate filtering device 141 are arranged in order in the vehicle width direction when seen in a plan view. Therefore, the diesel particulate filtering device 141 is located further away from the engine 21 than the selective catalytic reduction device 142.

Figure 7:
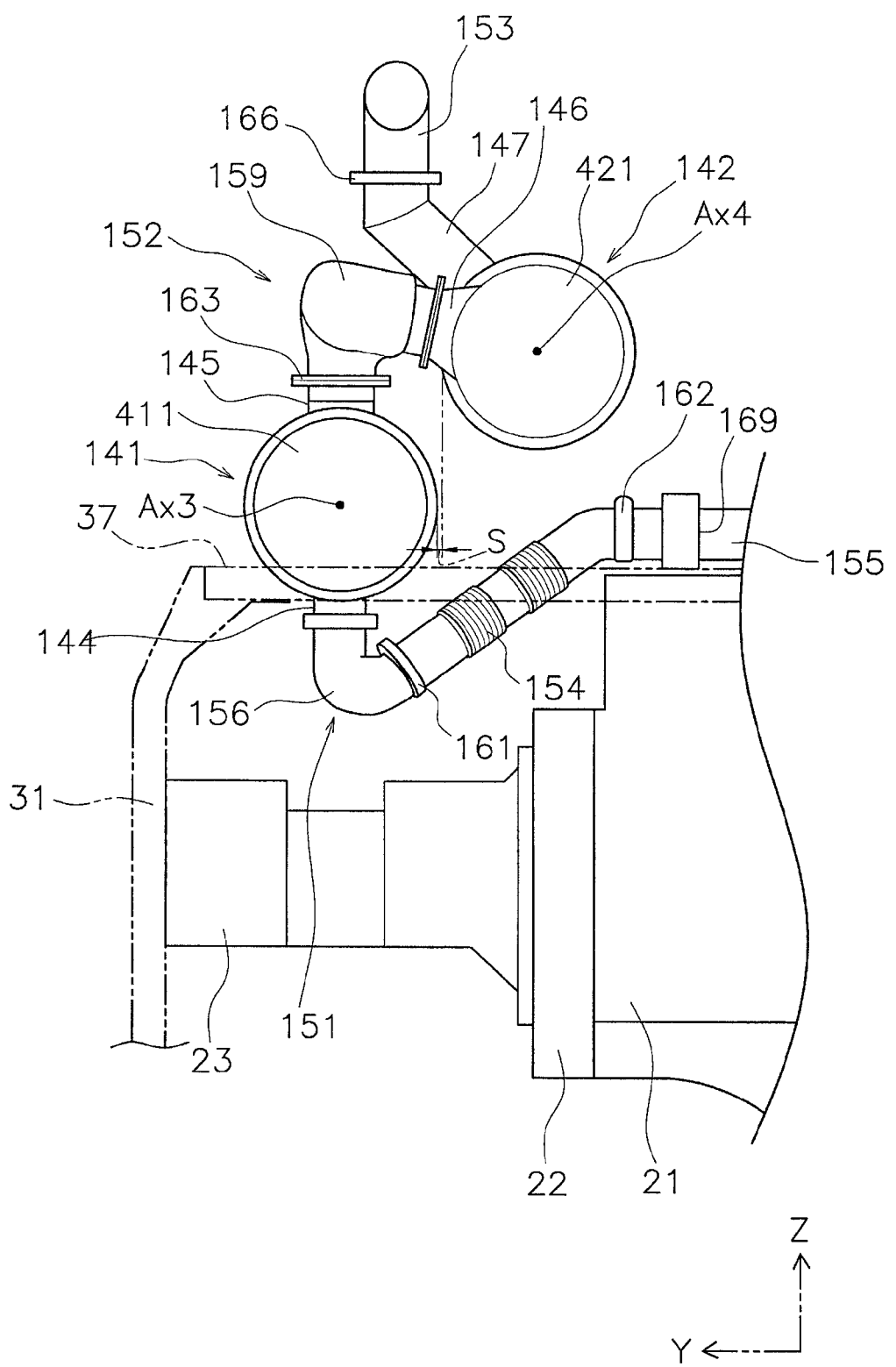
FIG. 7 illustrates the diesel particulate filtering device and the selective catalytic reduction device according to the second embodiment as seen from the rear.

FIG. 7 illustrates the diesel particulate filtering device 141 and the selective catalytic reduction device 142 as seen from the rear. Portions of the structure such as the bracket 143 are omitted in FIG. 7 to facilitate understanding. As illustrated in FIG. 7, at least a portion of the diesel particulate filtering device 141 is located below the selective catalytic reduction device 142. Specifically, the top portion of the diesel particulate filtering device 141 is located below the top portion of the selective catalytic reduction device 142. The bottom portion of the diesel particulate filtering device 141 is located below the bottom portion of the selective catalytic reduction device 142. The top portion of the diesel particulate filtering device 141 is located above the beam members 36, 37. The bottom portion of the diesel particulate filtering device 141 is located at the same height as the beam members 36, 37. The diesel particulate filtering device 141 is arranged above the hydraulic pump 23.

The selective catalytic reduction device 142 is a device for processing exhaust from the engine 21. The selective catalytic reduction device 142 conducts hydrolysis of urea and selectively reduces nitrogen oxides NOx. The selective catalytic reduction device 142 includes a second tubular body portion 421. The outer shape of the second tubular body portion 421 is a generally cylindrical shape. The central axis Ax4 of the selective catalytic reduction device 142 is arranged along the front-back direction. Therefore, the central axis Ax4 of the selective catalytic reduction device 142 is arranged to be orthogonal to the direction in which the engine 21 and the hydraulic pump 23 are arranged.

The selective catalytic reduction device 142 is arranged above the hydraulic pump 23. The bottom of the selective catalytic reduction device 142 is located above the upper surface of the engine 21. The bottom portion of the selective catalytic reduction device 142 is located above the beam members 36, 37. The bottom portion of the selective catalytic reduction device 142 is located below the top portion of the diesel particulate filtering device 141.

The first tubular body portion 411 of the diesel particulate filtering device 141 and the second tubular body portion 421 of the selective catalytic reduction device 142 are disposed apart from each other in the first direction with a space S therebetween in a plan view. Specifically the first tubular body portion 411 and the second tubular body portion 421 are not overlapped with each other in a plan view.

The diesel particulate filtering device 141 includes a first connection port 144. As illustrated in FIG. 7, the hydraulic excavator according to the second embodiment includes a first connecting pipe 151. As illustrated in FIG. 6, one end of the first connecting pipe 151 is connected to an exhaust port of the engine 21 through the supercharger 29. As illustrated in FIG. 7, the other end of the first connecting pipe 151 is connected to the first connection port 144 of the diesel particulate filtering device 141. Specifically, the first connecting pipe 151 couples the engine 21 and the diesel particulate filtering device 141.

The first connection port 144 is located in the bottom portion of the diesel particulate filtering device 141. The first connection port 144 projects downward from the first tubular body portion 411. Therefore, the connecting portion for the diesel particulate filtering device 141 and the first connecting pipe 151 are located directly below the diesel particulate filtering device 141. The first connecting pipe 151 extends from a position above the beam members 36, 37 to a position below the beam members 36, 37. A portion of the first connecting pipe 151 is located below the beam members 36, 37.

As illustrated in FIG. 7, the first connecting pipe 151 includes an extendable bellows part 154. For example, the bellows part 154 is formed by coupling a plurality of bellow-shaped extendable joints. The bellows part 154 is arranged obliquely. Specifically, the bellows part 54 extends obliquely downward in the vehicle width direction. The bellows part 154 extends obliquely downward further away from the engine 21. Specifically, the first connecting pipe 151 passes below the selective catalytic reduction device 142 to be connected to the diesel particulate filtering device 141. When the bellows part 154 is configured with the plurality of bellow-shaped extendable joints, the length of the bellows part 154 is the accumulative length of the bellow-shaped extendable joints.

The bellows part 154 is arranged above the hydraulic pump 23. The bellows part 154 is located below the connecting portion of the first connecting pipe 151 and the engine 21. A portion of the bellows part 154 is located at the same height as the beam members 36, 37. A portion of the bellows part 154 is located below the selective catalytic reduction device 142.

The length of the first connecting pipe 151 in the vehicle width direction is greater than the distance between the center of the diesel particulate collection in the vehicle width direction and filtering device 141 and the center of the selective catalytic reduction device 142 in the vehicle width direction. In other words, the length of the first connecting pipe 151 in the vehicle width direction is greater than the distance in the vehicle width direction between the center axis Ax3 of the diesel particulate filtering device 141 and the center axis Ax4 of the selective catalytic reduction device 142.

The length (path length) of the bellows part 154 is greater than the dimension of the diesel particulate filtering device 141 in the vehicle width direction. Specifically, the length of the bellows part 154 is greater than the diameter of the diesel particulate filtering device 141. The length of the bellows part 154 is greater than the dimension of the selective catalytic reduction device 142 in the vehicle width direction. That is, the length of the bellows part 154 is greater than the diameter of the selective catalytic reduction device 142.

The first connecting pipe 151 includes a linear section 155 and a bend section 156. The bend section 156 is connected to the first connection port 144. Then the bend section 156 couples the bellows part 154 and the first connection port 144. The bend section 156 is connected to the bellows part 154 through a spherical joint 161.

As illustrated in FIG. 6, the linear section 155 couples the bellows part 154 and the engine 21. As illustrated in FIG. 7, the linear section 155 is connected to the bellows part 154 through a spherical joint 162. The linear section 155 includes a shrinkage joint 169. The shrinkage joint 169 is provided in a manner to be able to shrink in the axial direction, that is, the vehicle width direction, in the linear section 155.

The diesel particulate filtering device 141 includes a second connection port 145. The second connection port 145 is located at the top portion of the diesel particulate filtering device 141. The second connection port 145 projects upward. The selective catalytic reduction device 142 includes a third connection port 146. As illustrated in FIG. 7, third connection port 146 is located at a side portion of the selective catalytic reduction device 142 toward the diesel particulate filtering device 141.

As illustrated in FIGS. 6 and 7, the exhaust processing unit 124 includes a second connecting pipe 152. One end of the second connecting pipe 152 is connected to the second connection port 145 of the diesel particulate filtering device 141. The other end of the second connecting pipe 152 is connected to the third connection port 146 of the selective catalytic reduction device 142. Specifically, the second connecting pipe 152 connects the diesel particulate filtering device 141 and the selective catalytic reduction device 142. The second connecting pipe 152 is located above the diesel particulate filtering device 141.

As illustrated in FIG. 6, the second connecting pipe 152 includes a linear section 157. The linear section 157 is located above the diesel particulate filtering device 141. The linear section 157 extends in a direction parallel to the central axis Ax4 of the selective catalytic reduction device 142. The second connecting pipe 152 includes a third bend section 158 and a fourth bend section 159.

As illustrated in FIG. 7, the third bend section 158 is connected to the second connection port 145 via a clamp 163. As illustrated in FIG. 6, the third bend section 158 is connected to the linear section 157 via a clamp 164. Then the third bend section 158 couples the linear section 157 and the second connection port 145. A urea water injection device 149 is attached to the third bend section 158. The urea water injection device 149 injects urea into the second connecting pipe 152.

The fourth bend section 159 is connected to the linear section 157. The fourth bend section 159 is connected to the third connection port 146. The fourth bend section 159 couples the linear section 157 and the third connection port 146.

As illustrated in FIG. 7, the selective catalytic reduction device 142 includes a fourth connection port 147. The fourth connection port 147 projects obliquely upward. Specifically, the fourth connection port 147 projects upward and obliquely toward the diesel particulate filtering device 141. The hydraulic excavator according to the second embodiment includes a third connecting pipe 153. The third connecting pipe 153 is connected to the fourth connection port 147. The third connecting pipe 153 is located above the urea water injection device 149, and the fourth connection port 147 is arranged obliquely to avoid interfering with the third connecting pipe 153 and the urea water injection device 149. Although not shown in the drawings, a top portion of the third connecting pipe 153 projects upward from the engine hood 17.

The engine 21, the first connecting pipe 151, the diesel particulate filtering device 141, the second connecting pipe 152, the selective catalytic reduction device 142, and the third connecting pipe 153 are connected serially in order. Therefore, the exhaust from the engine 21 passes through the first connecting pipe 151 and is fed to the diesel particulate filtering device 141. The diesel particulate filtering device 141 mainly reduces particulate matter in the exhaust. Next, the exhaust passes through the second connecting pipe 152 and is fed to the selective catalytic reduction device 142. NOx is mainly reduced in the selective catalytic reduction device 142. Next, the purified exhaust passes through the third connecting pipe 153 and is exhausted externally.

The bracket 143 illustrated in FIG. 5 couples the selective catalytic reduction device 142 and the diesel particulate filtering device 141. As a result, the selective catalytic reduction device 142, the diesel particulate filtering device 141, and the bracket 143 are formed in an integrated manner. The bracket 143 is fixed to the vehicle body frame 27. As a result, the exhaust processing unit 124 is fixed to the vehicle body frame 27. The bracket 143 is attached to the vehicle body frame 27 in a detachable manner by fixing means such as bolts. Therefore, the exhaust processing unit 124 can be removed from the vehicle by removing the bracket 143 from the vehicle body frame 27.

The diesel particulate filtering device 141 can be removed from the vehicle by removing the diesel particulate filtering device 141 from the bracket 143. In this case, the first connecting pipe 151 is removed from the first connection port 144. The second connecting pipe 152 is removed from the second connection port 145. The diesel particulate filtering device 141 then is removed from the bracket 143. The diesel particulate filtering device 141 is then moved laterally in a slung state with a crane and the like. The diesel particulate filtering device 141 is then moved upward by hoisting. As a result, the diesel particulate filtering device 141 can be removed from the vehicle.

As described above, the same effect can be achieved with the hydraulic excavator according to the second embodiment as the hydraulic excavator 100 according to the first embodiment.

Although an embodiment of the present invention has been described so far, the present invention is not limited to the above embodiments and various modifications may be made within the scope of the invention.

The diesel particulate filtering device is not limited to a cylindrical shape and may have an oval or rectangular shape. The selective catalytic reduction device is not limited to a cylindrical shape and may have an oval or rectangular shape.

The first direction is not limited to the vehicle width direction and may be another direction. Specifically, the diesel particulate filtering device and a selective catalytic reduction device may be arranged in a row in a direction that differs from the vehicle width direction. For example, the first direction may be the front-back direction of the vehicle. Specifically, the diesel particulate filtering device and the selective catalytic reduction device may be arranged in the front-back direction of the vehicle.

Figure 8:
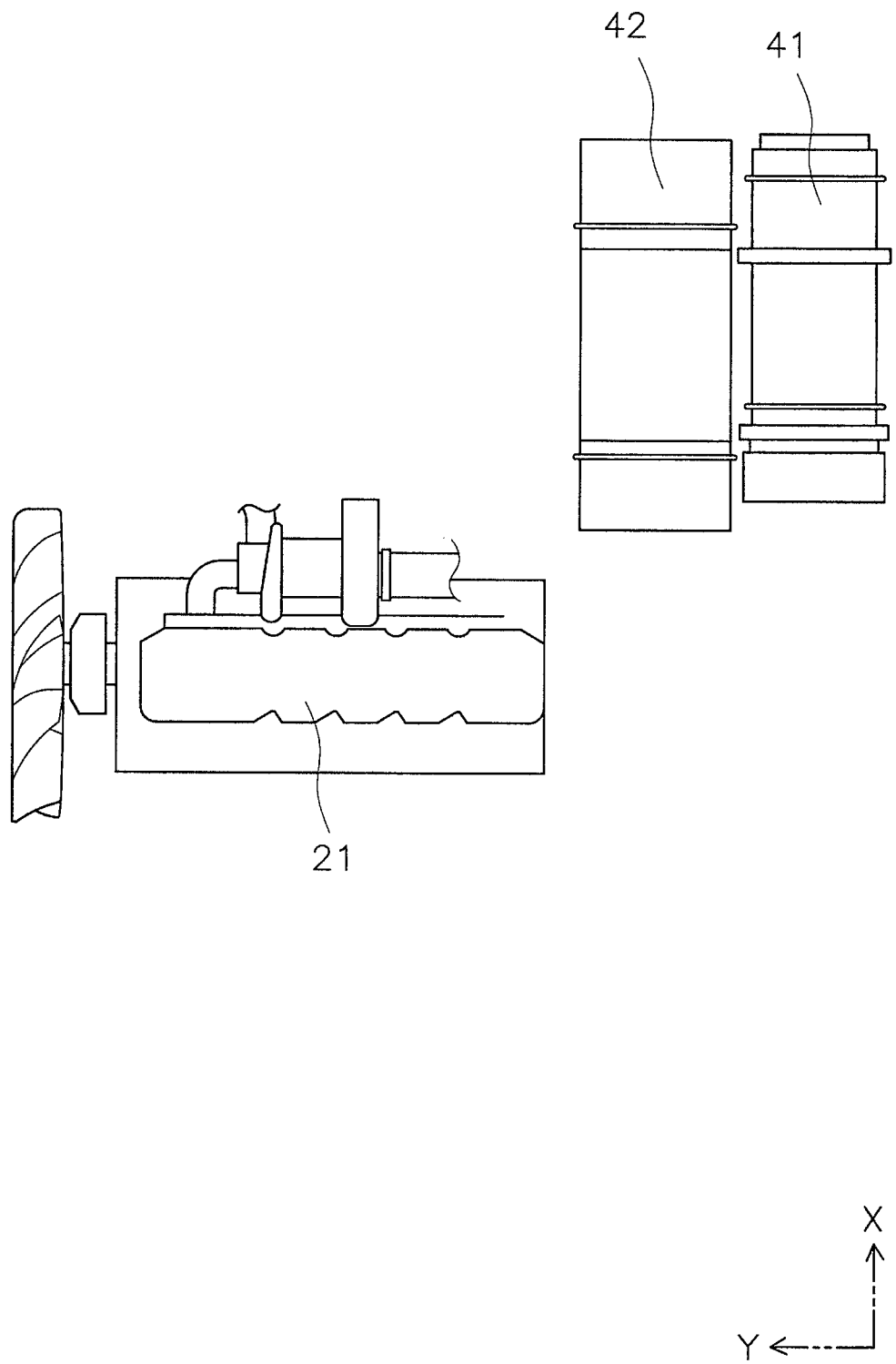
FIG. 8 is a schematic view of the arrangement of the diesel particulate filtering device, the selective catalytic reduction device, and the engine according to another embodiment.

The diesel particulate filtering device, the selective catalytic reduction device, and the engine may not be arranged in a line in the first direction. Specifically, the diesel particulate filtering device and the selective catalytic reduction device may be arranged with shifted state in a direction that differs from the first direction with respect to the engine. For example, as illustrated in FIG. 8, the diesel particulate filtering device 41 and the selective catalytic reduction device 42 may be arranged with shifted state in the vehicle front-back direction (X axis direction) with respect to the engine. In this case, the diesel particulate filtering device 41 is located further away from the engine 21 than the selective catalytic reduction device 42 in the first direction (Y axis direction).

Figure 9:
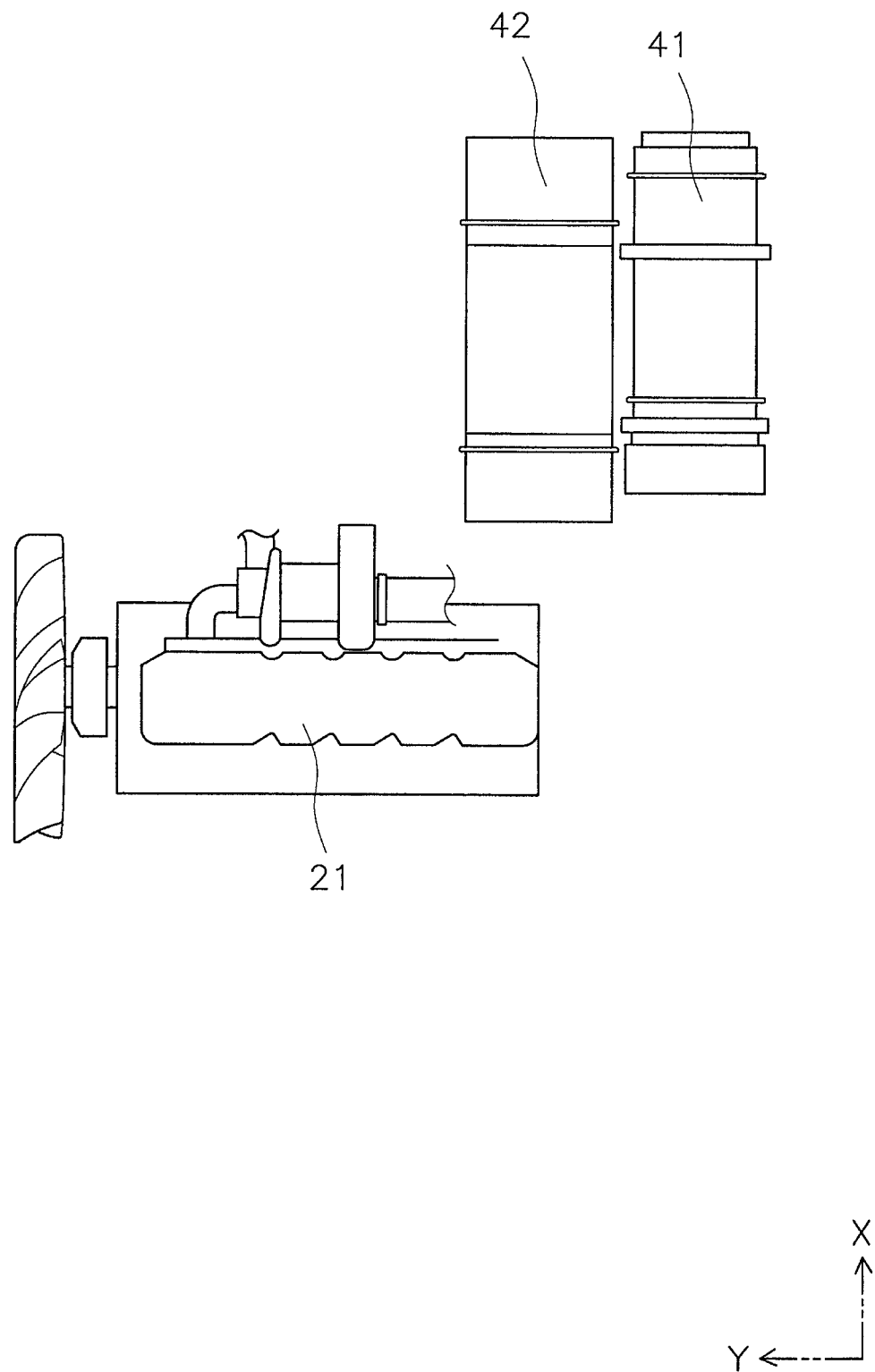
FIG. 9 is a schematic view of the arrangement of the diesel particulate filtering device, the selective catalytic reduction device, and the engine according to another embodiment.

The selective catalytic reduction device may not be arranged away in the first direction with respect to the engine. For example, as illustrated in FIG. 9, the selective catalytic reduction device 42 may be arranged in a location overlapping the engine 21 in the first direction. In this case, the diesel particulate filtering device 41 is located further away from the engine 21 than the selective catalytic reduction device 42 in the first direction (Y axis direction).

The diesel particulate filtering device may be supported by any of the column members 31 to 35. The selective catalytic reduction device may be supported by any of the column members 31 to 35. The vehicle body frame 27 that supports the diesel particulate filtering device and the selective catalytic reduction device is not limited to supporting the exterior cover 28. For example, a dedicated vehicle body frame for supporting the diesel particulate filtering device and the selective catalytic reduction device may be provided.

The first connecting pipe may be connected to the diesel particulate filtering device without a spherical joint. A portion or the entire spherical joint connected to the second connecting pipe and the third connecting pipe may be omitted. However, a spherical joint is preferably provided to facilitate positioning of the connecting pipes.

The bellows part may be provided for the entire first connecting pipe instead of a portion of the first connecting pipe. The length of the bellows part may be greater than the length described above. Alternatively, the length of the bellows part may be shorter than the length described above. However, the length of the bellows part is preferably greater to improve vibration absorption capability.

The diesel particulate filtering device 41 may be arranged below the selective catalytic reduction device 42 in the first embodiment. The selective catalytic reduction device 42 may be arranged above the beam members 36, 37.

The entire diesel particulate filtering device 141 may be arranged below the selective catalytic reduction device 142 in the second embodiment. A portion of the selective catalytic reduction device 142 may be arranged below the beam members 36, 37.

According to the present invention, a hydraulic excavator that can resolve complications when connecting the engine and the exhaust processing device and that can reduce a load on the connecting pipes due to vibration can be provided.

What is claimed is:

1. A hydraulic excavator comprising:
an engine;
a rotating frame configured to support the engine;
a vehicle body frame provided in a standing manner on the rotating frame, the vehicle body frame including a plurality of column members;
a diesel particulate filtering device configured to process exhaust from the engine, the diesel particulate filtering device being supported by the vehicle body frame, and the diesel particulate filtering device including a first tubular body portion;
a selective catalytic reduction device configured to process exhaust from the engine, the selective catalytic reduction device being supported by the vehicle body frame, and the selective catalytic reduction device including a second tubular body portion;
a connecting pipe having an extendable bellows part in at least a portion thereof, the connecting pipe connecting the engine and the diesel particulate filtering device; and
a connecting portion for the diesel particulate filtering device and the connecting pipe located at a lowermost point of the diesel particulate filtering device in an elevational view of the vehicle body frame,
the diesel particulate filtering device being located further away from the engine than the selective catalytic reduction device along a first direction on a horizontal plane,
the first tubular body portion of the diesel particulate filtering device and the second tubular body portion of the selective catalytic reduction device being disposed apart from each other with a space therebetween in a plan view of the vehicle body frame, and
a portion of the bellows part being located below the selective catalytic reduction device in an elevational view of the vehicle body frame.

2. The hydraulic excavator according to claim 1, wherein the first direction is a vehicle width direction.

3. The hydraulic excavator according to claim 2, wherein the second tubular body portion has a cylindrical shape; and a length of the bellows part is greater than a diameter of the second tubular body portion.

4. The hydraulic excavator according to claim 2, wherein
the first tubular body portion has a cylindrical shape; and
a length of the bellows part is greater than a diameter of the first tubular body portion.

5. The hydraulic excavator according to claim 1, wherein
the diesel particulate filtering device and the selective catalytic reduction device are arranged in a row and in a state in which respective longitudinal directions thereof are orthogonal to the first direction; and
a length of the bellows part is greater than a dimension of the diesel particulate filtering device in the first direction or a dimension of the selective catalytic reduction device in the first direction.

6. The hydraulic excavator according to claim 1, wherein
the diesel particulate filtering device and the selective catalytic reduction device are arranged in a row and in a state in which respective longitudinal directions thereof are orthogonal to the first direction; and
a length of the connecting pipe in the first direction is greater than a distance between a center of the diesel particulate filtering device along the first direction and a center of the selective catalytic reduction device along the first direction.

7. The hydraulic excavator according to claim 1, further comprising:
a second connecting pipe connecting the diesel particulate filtering device and the selective catalytic reduction device, wherein
exhaust from the diesel particulate filtering device is supplied to the selective catalytic reduction device through the second connecting pipe.

8. The hydraulic excavator according to claim 1, wherein
a connecting portion for the diesel particulate filtering device and the connecting pipe is located directly below the diesel particulate filtering device.

9. The hydraulic excavator according to claim 1, further comprising:
an external cover attached to the vehicle body frame.

10. The hydraulic excavator according to claim 1, wherein
the connecting pipe passes below the selective catalytic reduction device and is connected to the diesel particulate filtering device.

11. The hydraulic excavator according to claim 1, wherein
a first axis of the first tubular body portion of the diesel particulate filtering device is located above a second axis of the second tubular body portion of the selective catalytic reduction device in an elevational view of the vehicle body frame.

12. The hydraulic excavator according to claim 1, wherein
a first axis of the first tubular body portion of the diesel particulate filtering device is located below a second axis of the second tubular body portion of the selective catalytic reduction device in an elevational view of the vehicle body frame,
the connecting pipe includes a bend section connected to a bottom portion of the first tubular body portion and a linear section extending obliquely upward from the bend section, and
the bellows part is provided in the linear section.

\* \* \* \* \*